Aug. 23, 1960     T. H. GEWECKE     2,950,028
DISPENSING DEVICE
Filed May 3, 1957
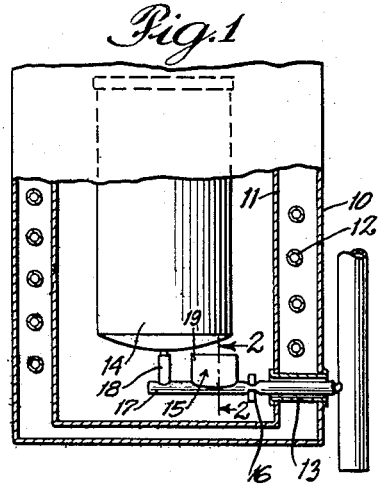
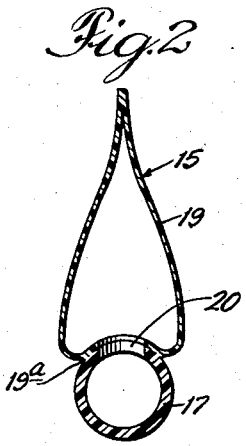
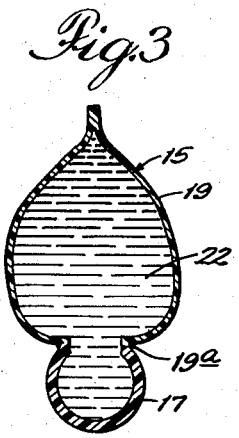
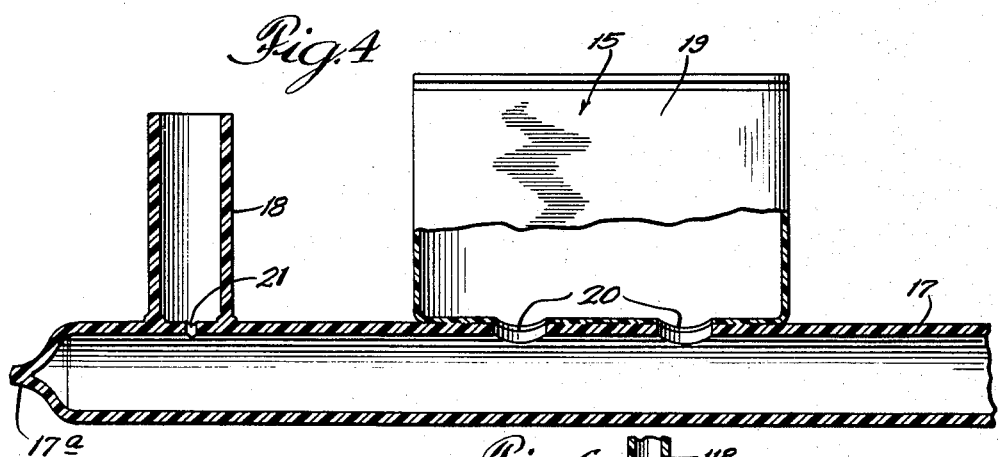
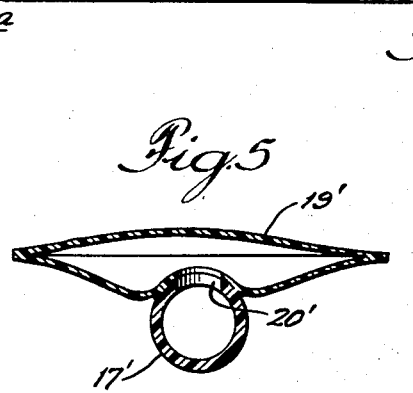
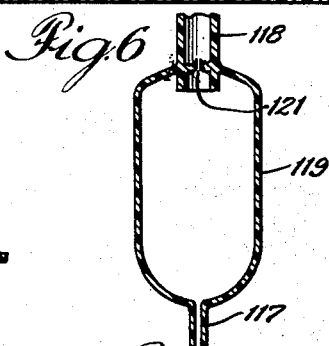
INVENTOR:
Theodore H. Gewecke,
BY Dawson, Tilton, Fallon + Lungmus,
ATTORNEYS.

United States Patent Office 2,950,028
Patented Aug. 23, 1960

2,950,028

DISPENSING DEVICE

Theodore H. Gewecke, 2105 Grove, Glenview, Ill.

Filed May 3, 1957, Ser. No. 656,909

3 Claims. (Cl. 222—95)

This invention relates to a dispensing device, and more particularly to a device for the gravity dispensing of liquids under a substantially constant head.

A definite problem exists in the dispensing of successive equal quantities of liquid from a container of fixed size. This problem exists because the level of the liquid in the reservoir from which the quantities are drawn, falls with each quantity dispensed and thus lowers the hydrostatic head promoting the flow of liquid. To successively obtain equal quantities of a liquid from such a reservoir, it has become necessary to permit longer and longer flow times as the reservoir is depleted.

Exemplary of apparatus concerned with this problem is the cream dispensing portion of an automatic coffee vending machine. Here, a container filled with cream is placed in the machine from time to time, generally each day, and communicates with the cup in which the coffee is dispensed. Since it is necessary that the cream be provided under hygienic conditions, the cream container and its associated piping must either be disposable or readily cleanable. For this purpose, it has been a practice to employ flexible tubing as the means for conducting the cream from the reservoir to the cup. The flow through the tubing is regulated by means of a clamping mechanism. The clamping mechanisms have become exceedingly conplex in order to provide the proper time of flow so as to obtain equal successive quantities of cream.

It is a general object of this invention to provide a device that overcomes the problems and difficulties outlined above. Another object is to provide a simple and reliable device for dispensing successive quantities of a liquid under a substantially constant head. Still another object is to provide a device of the character set forth in the object immediately preceding, which is associated with a reservoir of liquid and suitable clamping means.

Another object of this invention is to provide a device for dispensing successive quantities of liquid from a reservoir which includes a collapsible chamber. Yet another object is to provide a device for the purposes outlined above, in which the collapsible chamber is so arranged and proportioned as to have an internal volume greater than the quantity to be dispensed during the successive operation of the device and its associated elements. Other objects and advantages of this invention can be seen as this specification proceeds.

This invention will be explained, in a pictured embodiment, in conjunction with the accompanying drawing, in which—

Figure 1 is a schematic view of a dispensing device embodying teachings of this invention, in combination with a liquid reservoir; Fig. 2 is an enlarged cross-sectional view taken along the line 2—2 of Fig. 1; Fig. 3 is a view similar to the view shown in Fig. 2 but showing the chamber in a filled condition; Fig. 4 is an enlarged elevational view of a dispensing device embodying teachings of this invention, the view being partly in section; Fig. 5 is a cross-sectional view of a modified form of the device; and Fig. 6 is an elevational view, partially in section, of another modified form of the device.

In the illustration given, the numeral 10 denotes a casing, which may be of a cylindrical nature. The numeral 11 denotes an inner casing associated with casing 10 and providing a space therebetween for the mounting or refrigeration coils 12. The refrigerated casing briefly described above can be of the type used in automatic coffee vending machines to maintain a cream reservoir under suitable refrigerated conditions.

Such a reservoir is designated by the numeral 14 and is mounted by suitable means (not shown) within inner casing 11. Reservoir 14 communicates with the exterior of casing 10 through conduit opening 13, which extends through inner casing 11 and casing 10.

Extending through conduit opening 13 is resilient tubing 17. Associated with tubing 17 is a suitable clamp 16 and a dispensing device embodying teachings of my invention designated by the numeral 15. Tubing 17 communicates reservoir 14 with other suitable piping leading to a cup (not shown) which ultimately is to receive cream. With the exception of dispensing device 15, the structure designated by the numerals 10—16 is set forth for ease of understanding and environment in which dispensing device 15 is useful. Those skilled in the art may vary this environment and still obtain the benefits of this invention.

Referring now to Fig. 4, in which the dispensing device 15 is shown in enlarged form, the numeral 17 again denotes a flexible tubing such as is shown in the operating environment of Fig. 1. Tubing 17 is preferably constructed of a heat-sealable plastic such as polyvinyl chloride. In the illustration given, one end of tubing 17, designated 17a, is closed as by a transverse heat-seal. Adjacent end 17a is a vertical riser 18 which also can be provided by heat-sealable plastic material. Riser 18 is attached to tubing 17 and the interiors thereof are in communication. Thus, liquid from reservoir 14 flows downwardly through riser 18 and horizontally or laterally through tubing 17, the flow being interrupted as desired by clamp 16. Clamp 16 can be conveniently associated with a suitable timing mechanism (not shown), which controls the time during which clamp 16 permits flow to occur in tubing 17. Alternatively, it is possible to use other timing valve structures for the same purpose.

Mounted on tubing 17 is dispensing device 15, which is seen to include a collapsible chamber 19. In the illustration given, collapsible chamber 19 is secured to the top surface of tubing 17 by heat-sealing, chamber 19 being constructed also of a heat-sealable plastic material. I have achieved excellent results when chamber 19 is provided in the form of a flat sheet of heat-sealable plastic material. Thereafter, the sheet providing chamber 19 is secured to tubing 17 by one or more circular heat-seals such as are designated by the numeral 19a in Fig. 2. Thereafter, the central unsealed portion of the sheet providing chamber 19 and the adjacent portions of tubing 17 are punched out to form ports 20. Chamber 19 is completed thereafter by folding the sheet upon itself to form the structure shown in Figs. 2 and 3 and by heat-sealing along the three open sides.

Optimum results in the operation of this device are achieved when the liquid supply line between chamber 19 and reservoir 14 is provided with a constricted opening. This can be provided by making a small opening in the side wall of tubing 17 in the region of communication with riser 18 such as is indicated by the numeral 21 in Fig. 4. The following is a brief description of the operation of dispensing device 15 when employed in an environment such as is shown in Fig. 1.

*Operation*

Reservoir 14 is provided with a suitable quantity of liquid, such as cream. Clamp 16 or other suitable timing valve means is closed to permit liquid from reservoir 14 to fill riser 18, tubing 17 and chamber 19. The condition of chamber 19 after being filled with a liquid 22 is seen in Fig. 3. When liquid from the system is required, clamp 16 is opened for a given time. Upon opening of clamp 16, liquid flows out of chamber 19 through port 20 into tubing 17 and thence to a receiving vessel (not shown). The outflow of liquid from chamber 19 causes partial collapse of chamber 19 to the condition shown in Fig. 2. In the illustration given, it is intended that the quantity of liquid 22 to be dispensed during a given time is less than that contained within chamber 19. However, excellent results are obtainable when the entire contents of chamber 19 are dispensed, in which case chamber 19 will collapse to a flat condition wherein the walls defining chamber 19 assume a face-to-face relationship. When clamp 16 is again closed, chamber 19 is once again filled to a distended condition through the slow flow of liquid 22 through constricted opening 21.

It is to be appreciated that the discharge of liquid 22 past clamp 16 is substantially determined by the head existing in chamber 19 and not by the head existing in reservoir 14. This is achieved in the illustration given by providing ports 20 of substantially greater size than constricted opening 21. It is also to be appreciated that even if a subsequent quantity of liquid 22 is required from chamber 19 before it has had the opportunity to become redistended, the same quantity will be dispensed as before because of substantially the same head existing due to the fact that the walls of chamber 19 collapse laterally inwardly, preserving the height of liquid above tubing 17.

Satisfactory results are obtainable when dispensing device 15 is provided in the modified form shown in Fig. 5, wherein like numerals are employed to denote like elements but with the addition of a prime. In Fig. 5, chamber 19' is provided with the walls disposed horizontally, as contrasted to the vertical disposition of the walls of chamber 19 in Figs. 1–4. Here, however, it is to be noted that a variation of hydrostatic head will exist, due to the degree to which chamber 19' is distended by virtue of filling. Nonetheless, the satisfactory results are still obtained because the variation in head due to partial or complete filling of chamber 19' is substantially less than that which would exist at different stages of depletion of reservoir 14.

The form of my invention shown in Fig. 5 can be conveniently provided by heat-sealing a flat sheet of plastic material to the top surface of tubing 17', as by circular heat-seals, as mentioned above. Thereafter, a port 20' can be punched out of the portion of the sheet and tubing 17' within the circular heat-seal. Chamber 19' is completed by providing a second sheet of heat-sealable plastic material and heat-sealing it by a peripheral heat-seal to the sheet already attached to 17'.

Where space limitations do not require a horizontal conduit leading from a reservoir, it is possible to provide the dispensing device of my invention in a vertical disposition. Such a form is shown in Fig. 6, where again like numerals are employed to designate like elements but with the addition of 100. In Fig. 6, the numeral 119 designates a collapsible chamber, preferably constructed of a heat-sealable plastic material and conveniently provided by uniting two flat sheets of material in face-to-face relation by peripheral heat-seals. Communicating with the bottom of chamber 119 is outlet tubing 117. Communicating with the top of chamber 119 is inlet tubing 118. The flow of liquid from inlet tubing 118 to chamber 119 passes through constricted opening 121, substantially as outlined above. In the operation of this aspect of my invention, again substantially the same head will be exerted on a liquid flowing out of tubing 117, since the height of liquid in chamber 119 will usually be substantially the same and equal to the entire height of chamber 119 because of the walls thereof tending to collapse inwardly to a face-to-face condition.

While, in the foregoing specification, I have described at considerable length and in considerable detail certain specific embodiments of my invention, it will be understood that these embodiments are illustrative only and that many variations therein may be made by persons skilled in the art without departing from the spirit of my invention.

I claim:

1. In a cream dispenser for a coffee vending machine, and the like, a flexible, collapsible container, said container containing a pair of rectangular, flexible sheets arranged in face-to-face, aligned relation with the corresponding edges thereof united and with the envelopes so developed being disposed in a generally vertical plane when said sheets are in face-to-face relation, a reservoir positioned above said container, flow port means in the lower edge of said container, conduit means communicating said reservoir with said port means to deliver liquid to said container, conduit means leading from said port means to a on-off valve, and constriction means in the first-mentioned conduit means limiting the flow therein to a value appreciably less than the flow in the second-mentioned conduit means when said container is expanded by liquid contained therein and said valve is open.

2. The structure of claim 1 in which said container and conduit means are constructed of thermoplastic material.

3. In a cream dispenser for coffee vending machines, or the like, a flexible, collapsible container, said container containing a pair of rectangular, flexible sheets arranged in face-to-face, aligned relation with the corresponding edges thereof united and with the envelope so developed being disposed in a generally vertical plane when said sheets are in face-to-face relation, a reservoir positioned above said container, flow port means in said container, conduit means communicating said reservoir with said port means to deliver liquid to said container, second port means in said container positioned in the bottom thereof, conduit means leading from said second port means to an on-off valve, and constriction means in the first-mentioned conduit means limiting the flow therein to a value appreciably less than the flow in the second-mentioned conduit means when said container is expanded by liquid contained therein and said valve is open.

References Cited in the file of this patent

UNITED STATES PATENTS

| | | |
|---|---|---|
| 2,317,395 | Mercier | Apr. 27, 1943 |
| 2,828,769 | Cooper | Apr. 1, 1958 |